April 29, 1952 R. P. MARIÉ 2,594,954
HIGH-FREQUENCY AMPLIFYING SYSTEM
Filed Sept. 28, 1949 2 SHEETS—SHEET 1

INVENTOR
ROBERT P. MARIÉ
BY
Ben. J. Chrony
his ATTORNEY

April 29, 1952 R. P. MARIÉ 2,594,954
HIGH-FREQUENCY AMPLIFYING SYSTEM
Filed Sept. 28, 1949 2 SHEETS—SHEET 2

INVENTOR
ROBERT P. MARIÉ
BY Ben. J. Chromy
his ATTORNEY

Patented Apr. 29, 1952

2,594,954

UNITED STATES PATENT OFFICE 2,594,954

HIGH-FREQUENCY AMPLIFYING SYSTEM

Robert Pierre Marié, Neuilly, France, assignor to Societe francaise Sadir-Carpentier, Paris, France, a corporation of France Application September 28, 1949, Serial No. 118,375
In France October 11, 1948

11 Claims. (Cl. 179—171)

My invention has for its object a system for amplifying the energy of high frequency electromagnetic waves and aims chiefly at the incorporation of magnetrons in such a system. It has already been proposed, at various times, to use magnetrons as amplifiers by reason of the obvious advantages resulting from such a use, that is, simplicity of the apparatus, high efficiency, possibility of obtaining a considerable power and a wide band of wavelengths. This latter property is ascribable to the fact that in order to prevent any self oscillation of the magnetron, it is necessary to provide for the electronic beams a low resistance for which the theory of small signals gives the upper limit.

But the experiments made for such a purpose required generally a modification in the structure of the magnetron in order to modify the path of the electrons and have not provided heretofore satisfactory results.

Applicant has already found and patented through his assignee the Sadir Carpentier Company various inventions in this field. Reference is made herein to Patent No. 2,557,882 issued on June 19, 1951, assigned to the Sadir Carpentier Company and relating to improvements in systems for modulation of ultra-short waves; French patent of May 7, 1947, No. 946,689, for systems for modulating very short and ultra short waves and French patent of October 4, 1947, No. 954,798, for systems for the modulation of very short waves. These inventions show how it is possible to provide for the total or partial reflection of an electromagnetic wave on the electronic beam of a magnetron. Systems termed by applicant quarter wave devices or systems by reason of their similarity with the quarter wave plates of crystalline optics that show corresponding properties, allow separating the reflected waves from the incoming waves.

In other words, they allow sending a wave out through a first track A and receiving it again through another track B after it has been reflected partly or entirely by an impedance C without the state of said impedance C having any possible action on the input track A.

In the execution of the prior inventions, the impedance is constituted by the electronic beam of a magnetron.

It is a well known fact that the impedance of such a beam may form a positive or negative reactance or else a negative or positive resistance, that is a passive resistance. In the case where the resistance is negative, the coefficient of reflection is above 1 and the wave passing out through the above mentioned track B corresponds to the wave entering the guide along the path A, said wave having been amplified by the magnetron.

The present invention resorts to the above mentioned properties and has for its object the use of a magnetron associated with a coupling system through which it is possible to obtain satisfactory operation of the magnetron as an amplifier.

It is known that if inside a rectangular guide the surfaces of which are defined by the equations $z=0$, $z=a$, $y=-b/2$, $y=+b/2$, transverse electric waves $TE_{01}$ polarized in the direction of the vertical $z$ axis are caused to propagate. The transverse component of the magnetic field parallel to $oy$ passes through a maximum at the center of the guide and is proportional to $$\cos \frac{\pi y}{b}$$

It is equal to 0 if the rate of the stationary wave is infinite. The longitudinal component of the magnetic field is 0 at the center and maximum along the side walls. It is proportional to $$\sin \frac{\pi y}{b}$$

and is at right angles to the transverse component.

According to the value of the ratio of the stationary wave that is supported to be finite, there exist two planes $y=\pm yo$ such that at each of their points the magnetic field may be illustrated by a vector having a constant length and rotating in a horizontal plane.

According to one of its features, my present invention resorts to this property for producing a coupling system between the magnetron and the guide receiving at one end the energy to be amplified and providing at the other end the amplified energy.

For this purpose a system of wires is positioned at a point $y=yl$ near point $yo$, $x=o$ and $z=o$ of the guide. This system of wires after describing loops in various vertical planes passing through the straight line $y=yl$, $x=o$, pass through openings provided to the wall $z=o$ of the guide without contacting therewith. These wires after passing out of the guide form a polyphase line the voltages of which are in equilibrium for a suitable direction and area of the loops and a suitable selection of the value of $yl$. For instance it is possible to use small loops of similar shape located in planes forming with one another equal angles if $yl=yo$.

According to a further feature of my invention, the magnetron includes a number of anode segments that is equal to or a multiple of the number of phases of the above polyphase system, said anodes being associated with each of the phases whereby each of the preceding wires is connected with one or more anodes of the magnetron.

Figure 2:
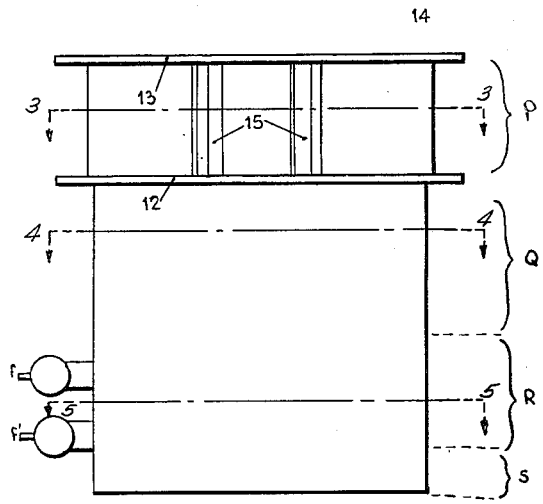
Fig. 2 illustrates a modification of this invention.
Figure 3:
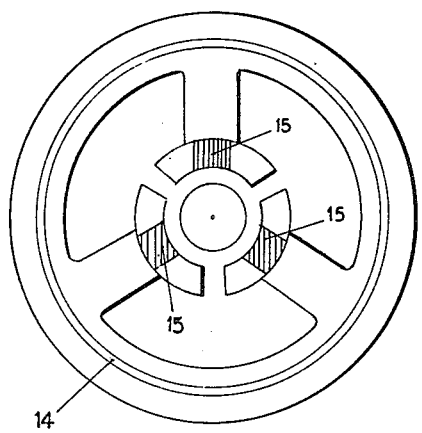
Figure 4:
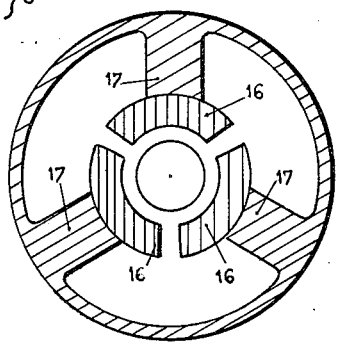
Figure 5:
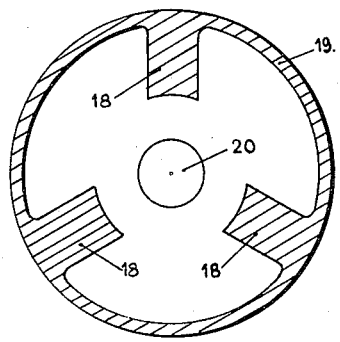

Figs. 3, 4 and 5 are cross sectional views taken along the lines 3—3, 4—4 and 5—5 respectively, of Fig. 2.

Figure 6:
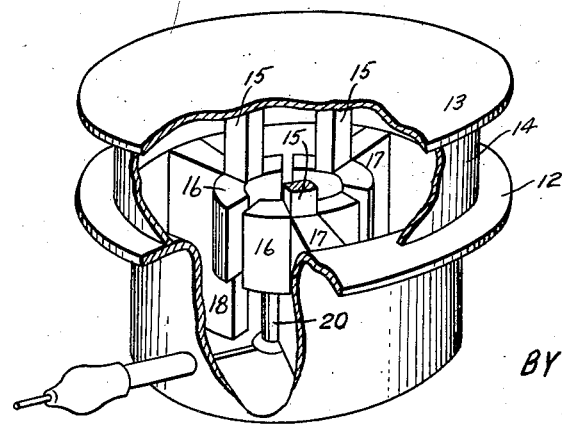

Fig. 6 is a view in perspective, partially broken away to show the assembly of elements inside of the device shown in Figs. 2, 3, 4 and 5.

Figure 1:
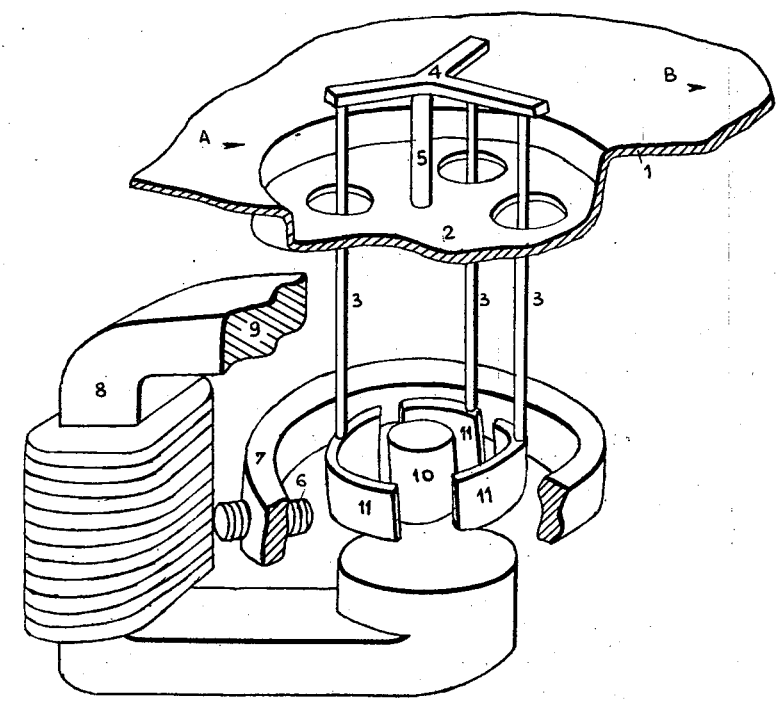
Fig. 1 illustrates a first embodiment incorporating the above feature of my invention in the particular case of a three phase system; of course, the invention is generally applicable to a system including any number of phases.

In Fig. 1, 1 designates the wall $z=0$ of the guide and 2 is a depression in this wall that eliminates any electrostatic action affecting synchronously the three wires 3 of the line so as to collect only equilibrated polyphase current. The three line wires 3 are connected through a metal star-shaped member 4 that is connected with the wall of the guide through a metal rod 5. The wires 3 communicate with the three anodes 11 of a magnetron the resonance of which is adjusted by means of screws 6 screwed into an annular member 7.

The magnet 8 illustrated as broken off at 9, produces a continuous magnetic field directed along the axis of the cathode illustrated diagrammatically by the cylinder 10. The figure shows, of course, only those elements that are essential for a proper understanding of the invention.

This system operates as follows: the energy to be amplified is fed into the guide from the direction A. It produces in the wires 3, as explained hereinabove, a substantially balanced polyphase current. It is well known that the magnetron may, with a suitable selection of the anode voltage and of the value of the magnetic field, behave as a negative impedance. These conditions are satisfied according to the invention and consequently the energy is reflected in the wires 3 from the magnetron and into the guide with a coefficient of reflection that is higher than unity. The loops formed by the ends of these wires and the members 4 and 5 form a directional coupling system. Consequently the amplified energy passes through the guide, exclusively in the direction B which provides the result sought for.

A modification of the above embodiment consists in providing another arrangement including a magnetron and a coupling system and positioning it symmetrically with reference to the central plane of the guide so as to double the coefficient of amplification while improving the equilibrium. It should be remembered however that the movements of the electrons should be symmetrical and consequently if the magnetic field is directed upwardly in one of the magnetrons it should be directed downwardly in the other magnetron.

I will now describe a further embodiment that differs from that disclosed hereinabove in that there is inserted in the path followed by the wires 3, between the guide and the magnetron, a wave filter arresting the waves of an undesired type.

Furthermore the coupling member forms also part of the magnetic circuit of the magnetron in order to reduce its reluctance as disclosed hereinafter.

According to an important feature of this modification the filtering provided consists in preventing the propagation of the waves that would cause all the anodes to oscillate in phase. This filtering relies on the following considerations:

In a circular guide, the wave $TM_{01}$ has a cutoff frequency that is higher than that of the wave $TE_{11}$ which latter is the wave the cutoff frequency of which is the lowest. In a guide the cross-section of which assumes the shape of a reentrant curve matching for instance the cross section of anodes of a magnetron of the so called slotted anode type, the cutoff frequency of the T M waves is much higher and the cutoff frequency of the waves T E is much lower than in the case of the circular guide of same diameter. Now the wave that may cause oscillation in phase of the anodes is of the T M type.

Consequently the guides having a reentrant section also allow stopping to the maximum extent and within the shortest time of these undesirable T M waves while feeding the magnetron with the useful waves of the T E type. My invention resorts to this property. The separating action is all the more energetic when the outline assumes a more marked reentrant shape.

Figs. 2 to 6 illustrate an embodiment of this modification, for reason of clarity of the drawing, the magnetron has been shown as possessing a minimum number of anodes, to wit 3, but of course any number may be used. The magnetron might operate with an even number of anodes but preferably even numbers are avoided because with such numbers the so called type oscillations appear and these are undesirable.

Fig. 2 is an outer view of the side of the arrangement in a plane parallel to the axis of the magnetron, said view showing the location of the different sections for which Figs. 3, 4 and 5 provide cross-sections perpendicular to the axis of the magnetron. Figs. 3, 4 and 5 are sectional views taken along the lines 3—3, 4—4 and 5—5 respectively, of Fig. 2.

The arrangement includes four sections P, Q, R, S, each of which is substantially homogeneous throughout its length considered axially.

The section P, the cross-section of which is shown in Fig. 3 is fitted in the guide of which it forms part and it is bounded by the discs 12 and 13 forming part of the walls $z=0$ and $z=a$ of the guide. It forms the section serving for the coupling with the wave progressing in the guide. A glass wall or a wall of a suitable dielectric substance 14 separates the inside of the arrangement from the atmosphere.

Three rods 15 receive the radiation of the electromagnetic field that is propagated through the guide and they transmit it to the next section Q. The rods 15 the extensions of which form the rods 16 of the section Q are preferably made of a metal of a very high magnetic permeability and they are covered with a film of a metal having a very good H F conductibility; they form part of the magnetic circuit of the magnetron according to the above disclosure. It is supposed that the guide used has metal walls. The rods 15 have their location defined by the same considerations as those referred to in the first modification, the coupling loop being closed by the conducting wall of the guide located on the side facing the magnetron and to which the rods are welded and consequently electrically connected.

The section Q filters the waves; Fig. 4 shows its cross section wherein appear thick partitions 17 assuming substantially the shape of the poles of a stator of electric machines, said partitions 17 giving the outline of the section its reentrant character. Consequently, this section provides for the passage of the waves of the T E mode, and stops the waves of the T M mode. The rods 16 have an outline such that they extend in annular formation in order to properly localise the magnetic field in the zone of the electronic beam of the actual magnetron constituted by the section E. The latter shown cross-sectionally in Fig. 5, is provided at 18 with partitions constituting with the outer wall 19 the usual magnetron recesses while the cathode is illustrated at 20. It will be noticed that in this modification the annular rod system 16 does not extend beyond the beginning of the cathode. No special description is required for the magnetron except for the fact that the number of its anode segments is preferably odd and that said anode segments 18 may or may not lie in alignment with the rods 16 of the wave filter section. $f$, and $f'$ designate in Fig. 2 the terminals for the filament heating current.

The section S forms the blind end of the magnetron.

The operation of the arrangement according to the present modification is the same as that disclosed hereinabove.

Obviously many details may be changed in the embodiments shown without unduly widening thereby the scope of the present invention as defined in accompanying claims.

The glass wall 14 instead of being located inside the guide may be located between the sections Q and R (Fig. 2). The shape of the magnetron recesses shown sectionally in Fig. 5, may be different from that illustrated and the same is the case of the shape illustrated in the cross sections (Figs. 3 and 4). It is also obvious that the amplifier described may be used as a modulator by varying the conditions of operation in accordance with the rhythm of a signal.

What I claim is:

1. A system for amplifying and modulating the energy of high frequency electromagnetic waves comprising directional coupling means, means for feeding the waves to be amplified to said coupling means, a multiple anode magnetron having the anodes thereof connected with said coupling means, the electronic beam of said magnetron forming a negative impedance for the waves transmitted to it and means associated with the coupling means for the transmission of the amplified waves reflected by the magnetron towards the coupling means.

2. A system for amplifying high frequency electromagnetic waves comprising a guide for the incoming waves, a coupling system positioned in said guide at a point thereof and including a plurality of loops in planes perpendicular to the axis of the guide and insulatingly passing therethrough, a magnetron coaxial with said coupling system and including a cathode, a ring-shaped system of anode elements connected respectively with said corresponding loops of said coupling system and means for producing a magnetic field axially of the magnetron.

3. A system for amplifying and modulating high frequency electromagnetic waves comprising a longitudinal guide for said waves including a side wall provided with a circular recess, coupling means inserted at a point of said guide and comprising a star-shaped member in a plane parallel with the side wall considered coaxially with the circular recess, means for connecting said star-shaped member with the center of the recessed portion of said side wall, conductive rods electrically connected with the corresponding ends of the arms of the star-shaped member and passing insulatingly through the depressed portion of the guide wall at points equally distributed round the axis of the star-shaped member and at equal distances therefrom and a magnetron including anode elements arranged coaxially with the star-shaped member and rigid with said rods, a cathode coaxially arranged inside said anodes and means for producing a magnetic field longitudinally of the cathode and anode system.

4. A system for amplifying and modulating high frequency electromagnetic waves comprising a longitudinal guide for said waves, coupling means inserted at a point of said guide and comprising a star-shaped member in a longitudinal plane of symmetry of the guide, conductive rods electrically connected with the corresponding ends of the arms of said star-shaped member and passing insulatingly through the guide wall to both sides of said plane of the shaped member at points equally distributed around the axis of said star-shaped member and at equal distances therefrom and a magnetron located on each side of and symmetrically disposed with respect to said guide and including anode elements arranged coaxially with said star-shaped member and rigid with said rods, a cathode coaxially arranged inside said anodes of each of the magnetrons and means for producing a magnetic field longitudinally of the cathode and anode system of each of said magnetrons.

5. A system for amplifying and modulating high frequency electromagnetic waves comprising a longitudinal guide for said waves including a side wall provided with a circular recess, coupling means inserted at a point of said guide and comprising a star-shaped member in a plane parallel with the side wall considered coaxially with the circular recess, means for connecting said star-shaped member with the center of the recessed portion of said side wall, conductive rods electrically connected with the corresponding ends of the arms of the star-shaped member and passing insulatingly through the depressed portion of the guide wall at points equally distributed round the axis of the star-shaped member and at equal distances therefrom and a magnetron including anode elements arranged coaxially with the star-shaped member and rigid with said rods, a cathode coaxially arranged inside said anodes and means for producing a magnetic field longitudinally of the cathode and anode system and a wave filter inserted between the guide and the magnetron.

6. A system for amplifying and modulating high frequency electromagnetic waves comprising a longitudinal guide for said waves, coupling means inserted at a point of said guide and comprising a star-shaped member in a longitudinal plane of symmetry of the guide, conductive rods of a magnetically highly permeable metal electrically connected with the corresponding ends of the arms of the star-shaped member and passing insulatingly through the guiding wall at points equally distributed round the axis of the star-shaped member and at equal distances therefrom and a magnetron including anode elements arranged coaxially with the star-shaped member and rigid with said rods, a cathode coaxially arranged inside said anodes and means for producing a magnetic field longitudinally of the cathode and anode system and a wave filter between the guide and the magnetron including an outer cylindrical wall and thick radial partitions projecting inwardly from said wall, terminating at a short distance from the axis of the cathode and registering longitudinally with the magnetron anodes.

7. A system for amplifying and modulating high frequency electromagnetic waves comprising a longitudinal guide for said waves, coupling means inserted at a point of said guide and comprising a star-shaped member in a longitudinal plane of symmetry of the guide, conductive rods of a magnetically highly permeable metal electrically connected with the corresponding ends of the arms of the star shaped member and passing insulatingly through the guiding wall at points equally distributed round the axis of the star-shaped member and at equal distances therefrom and magnetron including an outer cylindrical wall coaxial with said star-shaped member and reentrant radial anode elements projecting inwardly from said wall and rigid with said rods, a cathode coaxially arranged inside said anodes and means for producing a magnetic field longitudinally of the cathode and anode system and a wave filter between the guide and the magnetron including an outer cylindrical wall and thick radial partitions projecting inwardly from said wall, terminating at a short distance from the axis of the cathode and registering longitudinally with the magnetron anodes.

8. A system for amplifying high frequency electromagnetic waves comprising a guide for said waves, a directional coupling system positioned in said guide for receiving said waves from one direction, said coupling system including a plurality of pickup members connected to simulate a substantially balanced polyphase coupling system with respect to said electromagnetic waves, a magnetron having a cathode and a plurality of anode elements disposed about said cathode, means for producing a magnetic field axially through said magnetron, and connections for connecting different ones of said members of said coupling system to different ones of said anode elements to transmit said waves to said magnetron received from the aforesaid one direction and to transmit amplified waves from said magnetron to said coupling system for transmission in said guide in the opposite direction.

9. A system for amplifying high frequency electromagnetic waves comprising a guide for said waves, a coupling system positioned in said guide for receiving waves from one direction and transmitting waves in the opposite direction, said coupling system including a plurality of pickup members radially disposed around a common central member connected to said guide, a magnetron having a cathode and a plurality of anode elements disposed about said cathode, said anode elements corresponding to said pickup members, means for producing a magnetic field axially through said magnetron, and connections for connecting different ones of said pickup members of said coupling system to different ones of said anode elements.

10. A system for amplifying high frequency electromagnetic waves comprising a guide for said waves, a coupling system positioned in said guide for receiving waves from one direction and transmitting waves in the opposite direction, said coupling system including a plurality of pickup members arranged in said guide around an axis, a magnetron having a cathode that is coaxial with the aforesaid axis and a plurality of anode elements corresponding in number to said pickup members and disposed about said cathode, means for producing a magnetic field axially through said magnetron, and connections for connecting different ones of said members of said coupling system to different ones of said anode elements.

11. A system for amplifying high frequency electromagnetic waves comprising a guide for said waves, a directional coupling system positioned in said guide for receiving waves from one direction, said directional coupling system comprising a plurality of loops, all of said loops having a common connection to said guide, the planes parallel to and passing through different ones of said loops being disposed at predetermined angles to each other, a magnetron having a cathode and a plurality of anode elements disposed around said cathode, connections for connecting different ones of said anode elements to different ones of said loops, and means for energizing said magnetron so that said magnetron functions as a negative impedance device whereby the waves fed thereto by said loops are amplified by said magnetron and transmitted to said loops for transmission in said guide in the other direction.

ROBERT PIERRE MARIÉ.

REFERENCES CITED

The following references are of record in the file of this patent:

UNITED STATES PATENTS

| Number | Name | Date |
|---|---|---|
| 2,375,223 | Hansen | May 8, 1945 |
| 2,411,151 | Fisk | Nov. 19, 1946 |
| 2,481,151 | Powers | Sept. 6, 1949 |

FOREIGN PATENTS

| Number | Country | Date |
|---|---|---|
| 880,564 | France | Jan. 4, 1943 |